Oct. 9, 1928.
I. K. KREIDER
TRACTOR CULTIVATOR
Filed Oct. 28, 1925
1,687,457
3 Sheets-Sheet 1
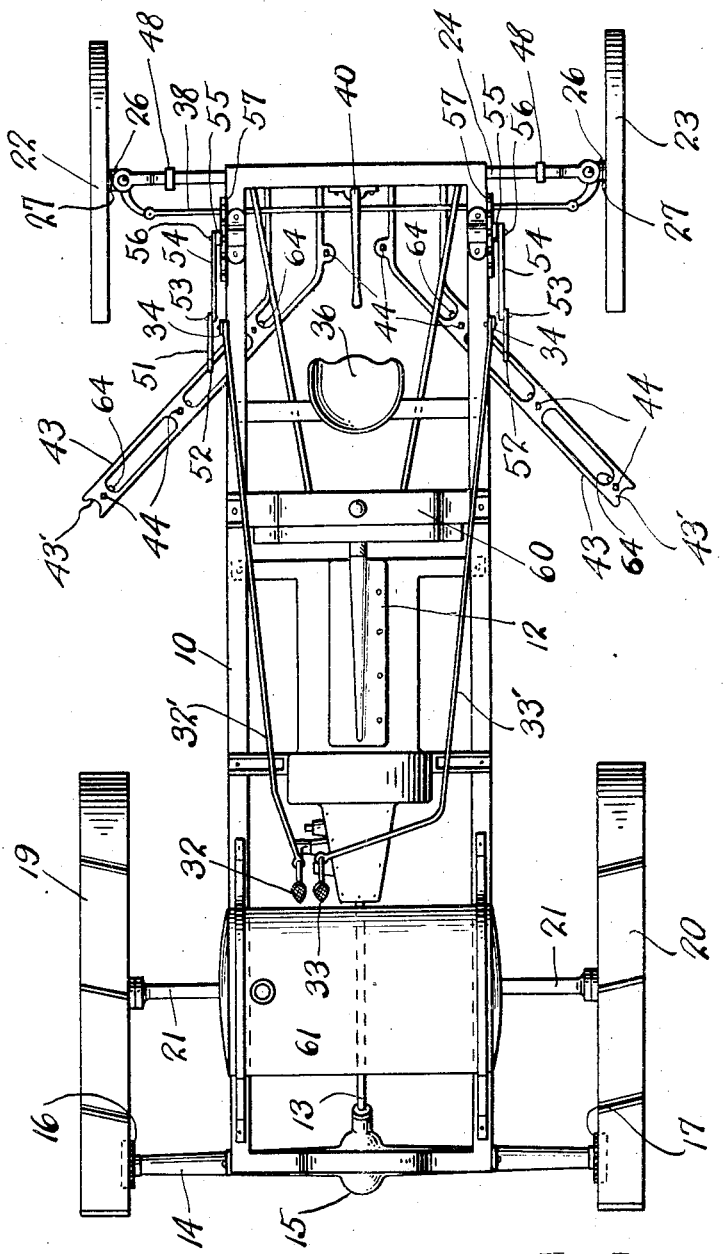
Irvin K. Kreider
INVENTOR
BY Victor J. Evans
ATTORNEY
L. B. James
WITNESS:

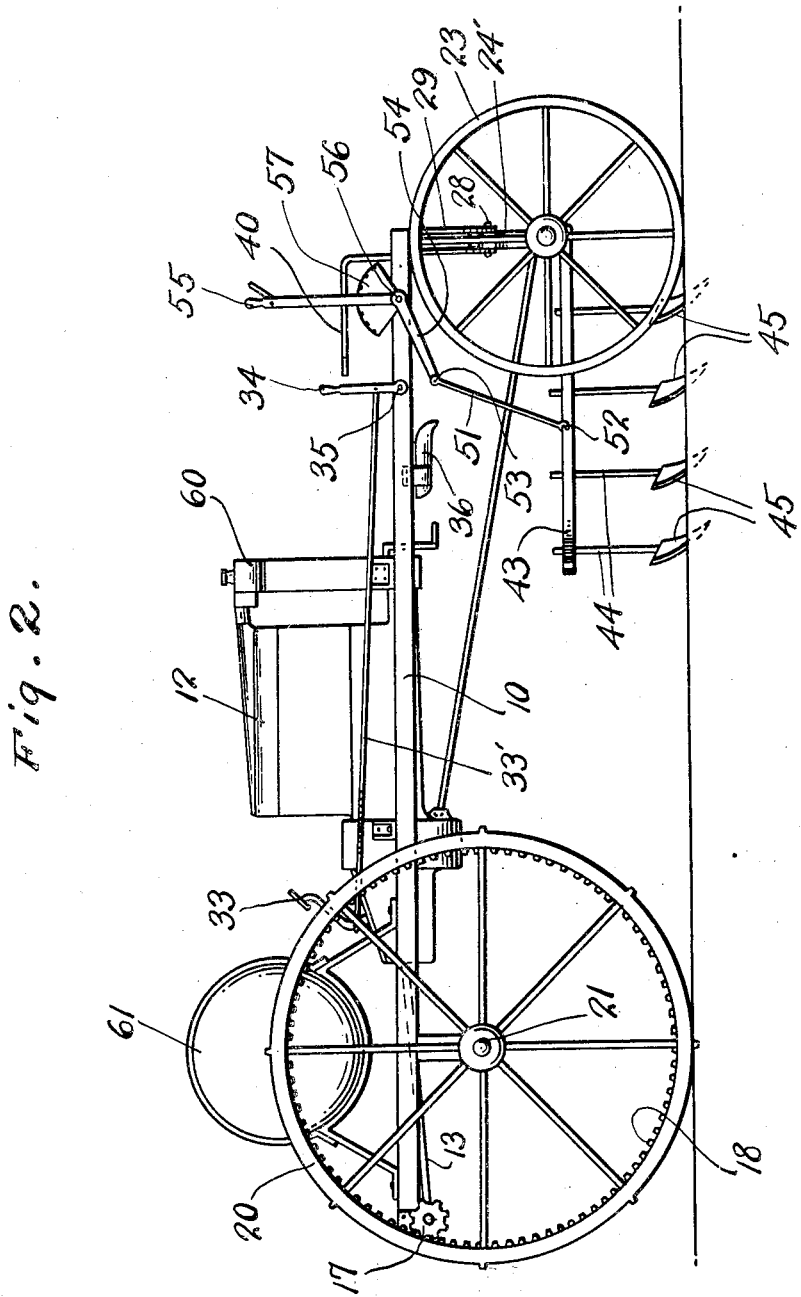

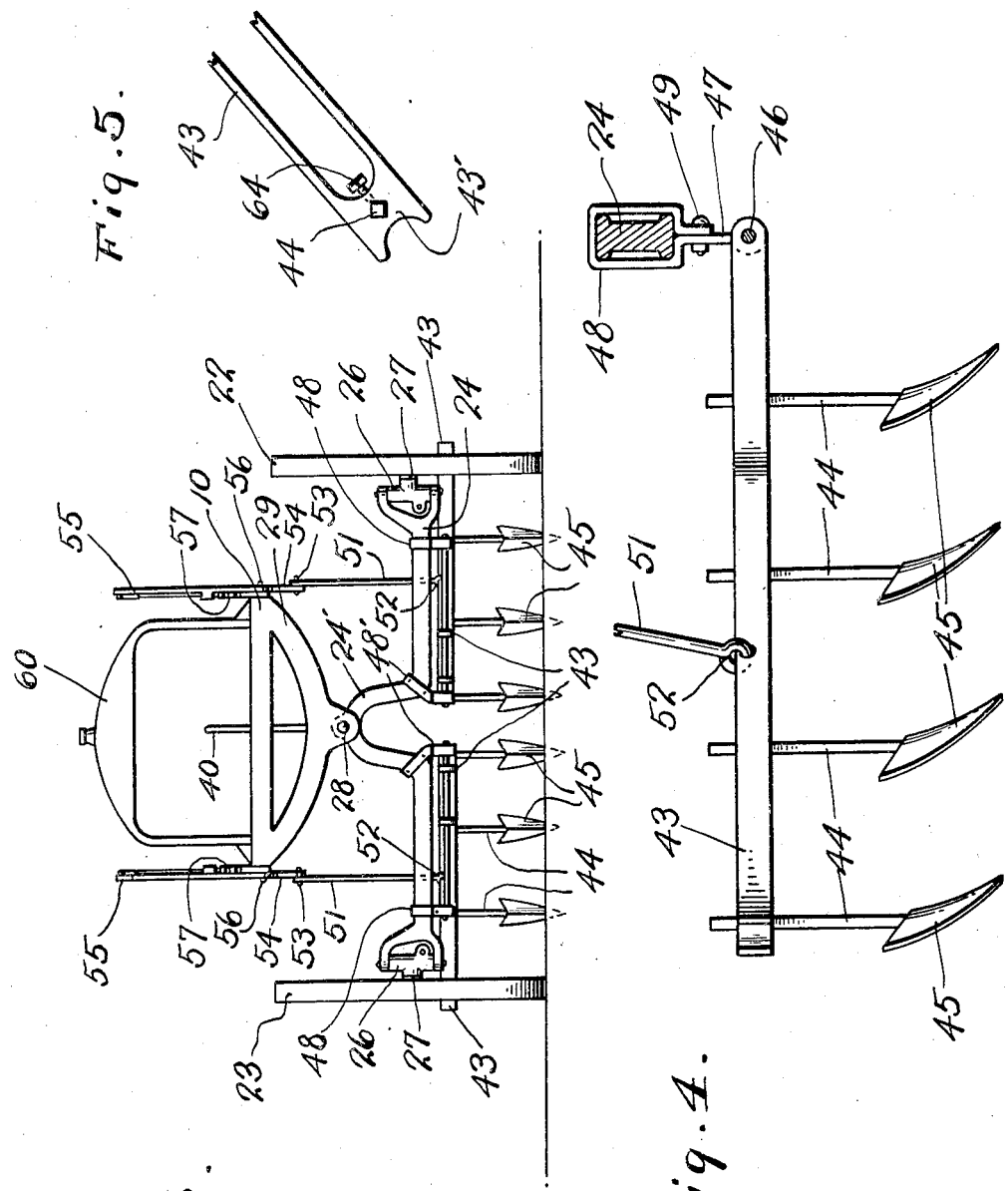

Patented Oct. 9, 1928.

1,687,457

UNITED STATES PATENT OFFICE.

IRVIN K. KREIDER, OF LANCASTER, PENNSYLVANIA.

TRACTOR CULTIVATOR.

Application filed October 28, 1925. Serial No. 65,419.

The object of this invention is to provide a combined tractor cultivator in which the cultivator gangs are at the front of the machine, instead of in the rear of the power unit. A further object is to provide a machine in which the view of the operator is unobstructed, the seat being between the power unit and the gangs and front axle, so that the operator may see the row to be cultivated, at all times.

A further object is to provide a machine in which the gangs are fixed with reference to the front axle, being adjustable rearwardly thereof, so that the turning of the front wheels is the only requirement in connection with correct guiding with reference to the row.

A further object is to provide for hand control, and control by means of pedals.

With the foregoing and other objects in view, the invention consists in the novel construction and arrangement of elements described, illustrated and claimed, it being understood that modifications may be made within the scope of the claim, without departing from the spirit of the invention.

In the drawing forming part of this application,

Figure 1 shows the machine in top plan.

Figure 2 is a view in side elevation.

Figure 3 is a view in front elevation.

Figure 4 is a detail view, chiefly in elevation, showing one of the gangs, and the means for effecting connection with the front axle, the latter being in vertical section.

Figure 5 is a detail view showing an element described below.

The main frame is designated 10, and mounted thereon in an approximately central position is a motor 12, imparting rotation to drive shaft 13 for imparting rotation to the rear axle, not shown in Figure 1, but mounted within housing 14. Differential mechanism is shown at 15. The elements of a two part axle carry, respectively, pinions 16 cooperating with internal gear rings, such as 18 rigid with reference to the ground wheels 19 and 20. These wheels last named are carried by axle members 21, and forward ground wheels 22 and 23 are mounted on front axle 24, this axle being forked at the ends thereof, and the forks mounting knuckles 26 carrying wheel spindles 27,—a standard type of con.. .uction being employed for this purpose.

Axle 24 includes a central arch portion 24 connected at 28 with the forward element 29 of the main frame 10. Standard control pedals 32 and 33 are connected by rods 32' and 33' with hand levers, such as 34, pivoted at 35 on frame 10, and within convenient reach of the operator when seated at 36 between the motor and the front axle and the cultivator gangs.

The spindles of the front wheels are controlled by rod 38, which in turn is controlled by hand lever or guiding lever 40.

The mounting of the cultivator gangs constitute an important feature. These devices include bars 43 to which the shanks 44 of shovels 45 are secured. Figure 1 shows that the gangs are in diverging relation, and Figure 4 shows the manner of connecting these gangs with the front axle 24.

Each bar 43 is pivotally connected at 46 with a hanger or the like 47, the upper portion of which constitutes a strap 48 adapted to pass around axle 24, the extreme end being secured by bolt 49. The straps 48 and other straps 48' are located on opposite sides of the central arch member of the front axle, as illustrated in Figure 1, and the gang supporting devices are deflected, in the manner shown in the view just named.

In order to control the elevation of the gangs, I provide links 51 pivoted at 52, to each bar 43 and pivotally connected at 53 with link 54 which is rigid with reference to operating lever 55. The lever is fulcrumed at 56, and the usual engaging elements thereof cooperate with segment 57, in an obvious manner, for retaining the gangs in adjusted position.

Associated with the engine is a radiator 60, and a fuel tank 61 is mounted above axle 21, those parts of the construction not directly concerned with the improvements herein specified being shown more or less conventionally. In Figure 5 I have shown a fragment of one of the bars 43, this element including a web portion 43 apertured for one of the shanks 44 of the shovel 45, the shanks being engaged by a set-screw or retaining bolt 64.

The machine thus constructed is capable of use to much greater advantage than a cultivator drawn by a separate tractor.

While I have illustrated a machine built for cultivating one row, it is obvious that the same principle may be carried out in a two-row machine.

What is claimed is:—

In a device of the class described, a main frame, ground wheels, means for driving some of said wheels, an arched front axle and a rear axle for mounting the ground wheels, and cultivator gangs including bars having their forward ends converging, clamp-like hangers for pivotally connecting the converging ends, respectively, with the base portions of the arch of the front axle, and means for separately changing the elevation of the gangs at points rearwardly of the pivotal points thereof, these means including levers pivoted on the frame and links controlled by the levers and having connection with the bars of the gangs.

In testimony whereof I affix my signature.

IRVIN K. KREIDER.